United States Patent [19]

Pepper

[11] 3,774,087

[45] Nov. 20, 1973

[54] MEMORY ELEMENTS

[75] Inventor: Michael Pepper, London, England

[73] Assignee: Plessey Handel Und Investments A.G., Zug, Switzerland

[22] Filed: Dec. 8, 1972

[21] Appl. No.: 313,374

[30] Foreign Application Priority Data

Dec. 5, 1972 Great Britain ........................ 370/72

[52] U.S. Cl. ......... 317/235 R, 317/235 B, 307/238, 307/304

[51] Int. Cl. ............................................ H01l 11/14

[58] Field of Search .................... 317/235 B, 235 G, 317/235 AT; 307/238, 304; 340/173 R, 173 FF

[56] References Cited

UNITED STATES PATENTS 3,728,695 4/1973 Frohman-Bentchkowsky .... 317/235

*Primary Examiner*—Jerry D. Craig

*Attorney*—Samuel Scrivener, Jr. et al.

[57] ABSTRACT

A memory element which is an improved version of the known FAMOS (floating avalanche-injection metal-oxide-silicon) memory elements in that memory erasure is effected electrically. The structure of the known FAMOS memory elements is modified by having at least one diffused region in the silicon substrate which is isolated from the elements gate and drain electrodes, which is of opposite conductivity type to the substrate, and which is situated adjacent to the channel region between the gate and drain electrodes. At least one region of the substrate situated adjacent to the channel region is also isolated from the gate and drain electrodes, the buried gate of the FAMOS structure partially overlaps these isolated regions and a second gate is provided on the surface of the dielectric layer of the FAMOS structure such that it is above and completely overlaps the silicon gate.

7 Claims, 4 Drawing Figures

MEMORY ELEMENTS

The invention relates to memory elements.

Memory elements having a floating avalanche-injection metal-oxide-silicon (FAMOS) structure are known and have been described by Dov Frohman-Betchkowsky in Electronics, May 10, 1971 at pages 91 to 95 inclusive. The FAMOS memory elements can be electrically programmed but cannot be electrically erased since the electrically isolated gate of the element which traps the charge to effect a memory condition, is not accessible electrically. Erasure is effected by shining ultraviolet light on the FAMOS memory element, the ultraviolet light causing a photocurrent to flow from the gate to the silicon thereby discharging the gate to an uncharged condition.

The invention provides a memory element including a silicon substrate of a first conductivity type having first and second spaced-apart regions of a second conductivity type formed in a major surface thereof such that a channel region of the first conductivity type is provided therebetween at least one region of the substrate situated adjacent to the channel region being isolated from the first and second regions; at least one other region of the second conductivity type formed in the said major surface adjacent to the channel region, the said one other region being isolated from the first and second regions; a dielectric layer formed on the said major surface such that it covers the first and second regions, the said one other region and the isolated substrate region; a silicon gate buried within the dielectric layer such that it is substantially parallel to, and electrically isolated from the said major surface, the silicon gate partially overlapping each of the first and second regions, the said one other region and the isolated substrate region; a first electrode formed on the surface of the dielectrical layer such that it is above and completely overlaps the silicon gate; and second and third electrodes which are each in electrical contact with a separate one of the first and second regions.

Figure 1:
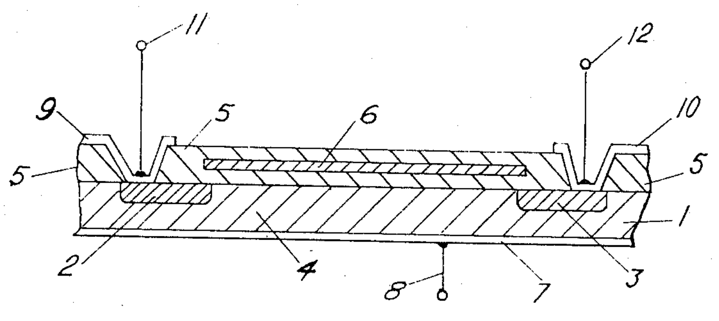
Figure 2B:
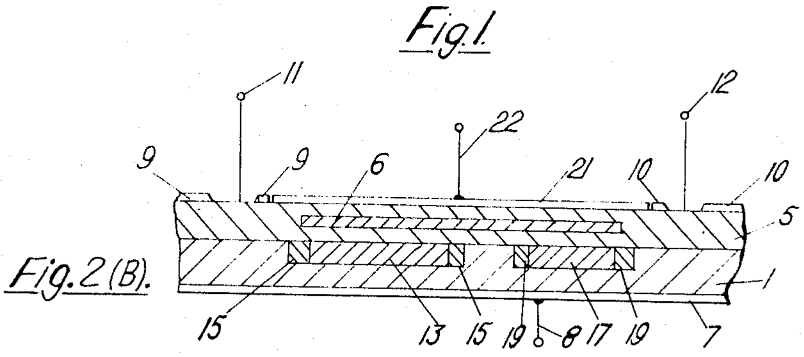
Figure 2A:
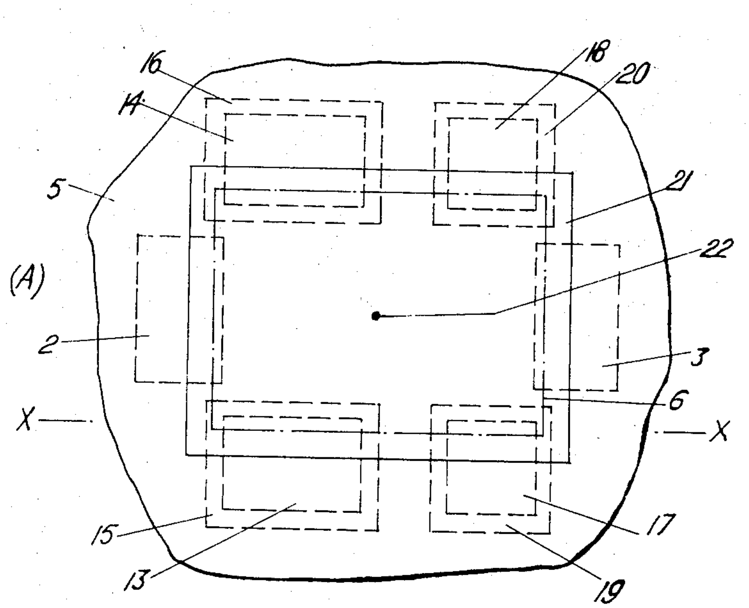
Figure 3:
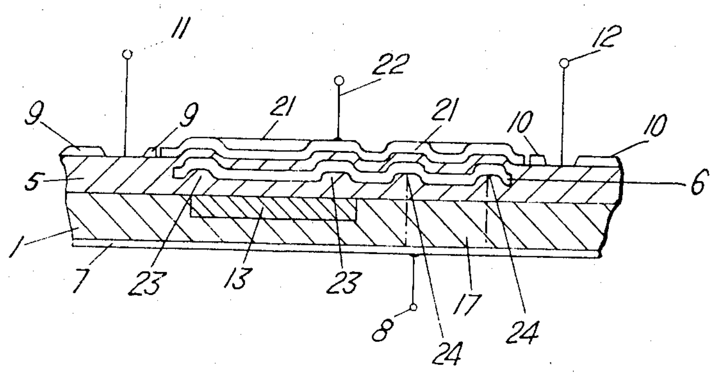

The foregoing and other features according to the invention will be better understood from the following description with reference to the accompanying drawings, in which:

FIG. 1 diagrammatically illustrates a cross-sectional side elevation of a known FAMOS memory element, FIGS. 2(A) and 2(B) diagrammatically illustrate respectively in a plan view and cross-sectional side elevation on the line 'X—X' a memory element according to the invention, and FIG. 3 diagrammatically illustrates a cross-sectional side elevation of a modified arrangement of the memory element according to FIGS. 2(A) and 2(B)

Referring to FIG. 1 of the drawings, a cross-sectional side elevation of a FAMOS memory element is diagrammatically illustrated therein and includes an *n*-type silicon substrate 1 having p+ type diffused regions 2 and 3 formed in a major surface thereof by any known technique. The diffused regions 2 and 3 which are the source and drain diffusions for the FAMOS memory element, are spaced apart to provide a channel region 4 therebetween.

A dielectric layer 5 preferably of silicon dioxide is formed in a known manner on the major surface of the substrate 1, and a silicon gate 6 is buried within the layer 5 such that it is substantially parallel to, and electrically isolated from, the major surface of the substrate 1. The silicon gate 6 partially overlaps the diffused regions 2 and 3.

An electrically conductive layer 7 is formed in a known manner on the other major surface of the substrate 1 and an electrical conductor 8 is connected to the layer 7.

Electrodes 9 and 10 are supported by the layer 5 and are respectively in electrical contact with the diffused regions 2 and 3. Electrical conductors 11 and 12 are respectively connected to the electrodes 9 and 10.

The FAMOS memory element of FIG. 1 is known and has been described in the previously cited publication.

The silicon gate 6 is, due to its electrical isolation within the layer 5, kept floating and charge is transported from the source 2 or drain 3 of the element to the floating gate 6 by avalanche injection. The manner in which the charging is accomplished and its effects are described in the previously cited publication.

Erasure is, as previously stated, effected by ultraviolet light and this seriously limits the utility of the memory element.

A memory element according to the present invention which is diagrammatically illustrated in FIGS. 2(A) and 2(B) of the drawings respectively in a plan view and a cross-sectional side elevation on the line 'X—X', is an improved version of the FAMOS memory element of FIG. 1 and is non-volatile and electrically dischargeable.

As illustrated in FIGS. 2(A) and 2(B), the structure of the memory element according to the invention includes all the physical features of the FAMOS memory element of FIG. 1, the source and drain electrodes 9 and 10 of FIG. 1, and the associated conductors 11 and 12 being omitted from FIG. 2(A) for the sake of clarity.

In addition to the FAMOS structure, the structure of FIGS. 2(A) and 2(B) includes p+ type diffused regions 13 and 14 which are formed in the major surface of the substrate 1 by any known technique on opposite sides of the channel region 4, and which are respectively isolated from the source and drain electrodes 9 and 10 by means of layers 15 and 16 of thick silicon dioxide which surround the diffused regions. Regions 17 and 18 of the *n*-type silicon substrate 1 on opposite sides of the channel region 4 are also isolated from the source and drain electrodes 9 and 10 respectively by means of the surrounding layers 19 and 20 of thick silicon dioxide. The regions 13, 14, 17 and 18 are arranged such that they are partially overlapped by the silicon gate 6.

An electrode 21 is formed by any known technique on the upper surface of the layer 5 such that it is above and completely overlaps the silicon gate 6. An electrical conductor 22 is connected to the electrode 21.

In the memory element according to FIGS. 2(A) and 2(B), the storage condition is established by applying a series of positive pulses via the electrical conductor 22 to the electrode 21, the layer 7 being at earth potential. This causes an avalanche breakdown to be initiated in the p+ type diffused regions 13 and 14 which results in the injection of hot electrons into the layer 5, the thick silicon dioxide layers 15 and 16 allowing the avalanche breakdown of the regions 13 and 14 to be initiated. If the layers 15 and 16 were not present minority carrier injection would occur and damp out the avalanche thereby rendering the device inoperable in the described mode. The electrons flowing through the layer 5 charge the electrically isolated gate 6 negatively and thereby give rise to a storage condition.

The application of a series of negative pulses via the electrical conductor 22 to the electrode 21 causes avalanche breakdown to be initiated in the *n*-type regions 17 and 18, and the injection of hot holes into the layer 5, the thick silicon dioxide layers 19 and 20 allowing the avalanche breakdown to be effected. The hole current flowing in the layer 5 intercepts the electrically isolated gate 6 and discharges it to its initial uncharge condition. The memory element according to the invention is, therefore, electrically dischargeable.

Isolation of the regions 13, 14, 17 and 18 from the source and drain electrodes could also be effected by the use of a thick dielectric over the edges of these regions. This method of isolation is diagrammatically illustrated in FIG. 3 of the drawings in a cross-section side elevation.

As illustrated in FIG. 3, the structure of this memory element is a modified arrangement of the memory element according to FIGS. 2(A) and 2(B) in that the thick oxide layers 15, 16, 19 and 20 are omitted and in that isolation of the regions 13 and 14 from the source and drain electrodes is effected by increasing the thickness of the dielectric layer 5 in those sections i.e., the sections 23, which are contiguous with the edges of each of the isolated regions 13 and 14. The regions 17 and 18 of the *n*-type substrate are defined by, and isolated from the source and drain electrodes by means of, sections 24 of the dielectric layer 5 which are of substantially the same thickness as the sections 23.

The electrode 21 and silicon gate 6 are shaped in conformity with the variations in the thickness of the dielectric layer 5.

The memory element according to FIG. 3 operates in substantially the same manner as the memory element according to FIGS. 2(A) and 2(B), avalanche breakdown of the *p*+type regions 13 and 14 and the *n*-type regions 17 and 18 being allowed to be initiated respectively by the sections 23 and 24 of the dielectric layer 5.

It should be noted that whilst it is preferable to have two *p*+ type regions for effecting a storage condition and two *n*-type regions for effecting electrical erasure of the stored information, the number of regions that could be utilised for each function can be greater or less than two. For example, storage and erasure could be effected respectively by means of a single p+ type region and a single *n*-type region although the operating efficiency of the memory element would be reduced. When only two regions are provided they can be situated on the same or opposite sides of the channel region.

Whilst *p*-channel memory elements have been outlined in the preceding paragraphs, the elements are operable in the *n*-channel mode.

It is preferable to use silicon dioxide for the layer 5 although other dielectrics of narrower band gap than silicon dioxide could be used in order to reduce the speed of charging and discharging the memory element. The use of the other dielectrics would however also reduce the storage time.

The main advantages of the memory element according to the invention over the known memory elements are that *a* memory erasure is effected electrically, *b* the memory is non-volatile, *c* the avalanching of a *p–n* junction is avoided thereby giving rise to a reduction in the power consumption of the element, *d* the method of carrier injection via pulsed avalanche is more efficient than the *p–n* junction method of the FAMOS memory element, and *e* the memory element is addressed via the electrode 21 rather than the source or drain regions 2 and 3.

What is claimed is:

1. A memory element including a silicon substrate of a first conductivity type having first and second spaced-apart regions of a second conductivity type formed in a major surface thereof such that a channel region of the first conductivity type is provided therebetween, at least one region of the substrate situated adjacent to the channel region being isolated from the first and second regions; at least one other region of the second conductivity type formed in the said major surface adjacent to the channel region, the said one other region being isolated from the first and second regions; a dielectric layer formed on the said major surface such that it covers the first and second regions, the said one other region and the isolated substrate region; a silicon gate buried within the dielectric layer such that it is substantiall/ parallel to, and electrically isolated from, the said major surface, the silicon gate partially overlapping each of the first and second regions, the said one other region and the isolated substrate region; a first electrode formed on the surface of the dielectrical layer such that it is above and completely overlaps the silicon gate; and second and third electrodes which are each in electrical contact with a separate one of the first and second regions.

2. A memory element as claimed in claim 1 wherein the element includes two regions of the second conductivity type formed in the said major surface on opposite sides of the channel region, the two regions being partially overlapped by the silicon gate and isolated from the first and second regions and wherein two regions of the substrate situated on opposite sides of the channel region are isolated from the first and second regions and partially overlapped by the silicon gate.

3. A memory element as claimed in claim 1 wherein each of the isolated regions is surrounded in the substrate by an oxide layer to effect isolation of the region from the first and second regions.

4. A memory element as claimed in claim 3 wherein each of the oxide layers is of silicon dioxide.

5. A memory element as claimed in claim 1 wherein the thickness of those sections of the dielectric layer which are contiguous with the edges of each of the isolated regions is greater than the thickness of the remainder of the dielectric layer by an amount which effects isolation of the regions from the first and second regions.

6. A memory element as claimed in claim 1 wherein the first conductivity type is *n*-type and wherein the second conductivity type is *p*+ type.

7. A memory element including a silicon substrate of a first conductivity type having first and second spaced apart regions of a second conductivity type formed in a major surface thereof such that a channel region of the first conductivity type is provided therebetween, two regions of the substrate situated one on each side of the channel region being isolated from the first and second regions; third and fourth regions of the second conductivity type formed in the said major surface and situated one on each side of the channel region, the third and fourth regions being isolated from the first and second regions; a dielectric layer formed on the said major surface such that it covers the first second third and fourth regions and isolated substrate regions; a silicon gate buried within the dielectric layer such that it is substantially parallel to, and electrically isolated from, the said major surface, the silicon gate partially overlapping each of the first second second third and fourth regions and the isolated substrate regions; a first electrode formed on the surface of the dielectric layer such that it is above and completely overlaps the silicon gate; and second and third electrodes which are each in electrical contact with a separate one of the first and second regions.

* * * * *